United States Patent [19]

Belttari et al.

[11] 4,230,427
[45] Oct. 28, 1980

[54] BOTTOM FACE MILL

[76] Inventors: Stanley C. Belttari, 4451 Cedar, West Bloomfield, Mich. 48013; Mark Jacobson, 3865 Benstein, Milford, Mich. 48042

[21] Appl. No.: 966,784

[22] Filed: Dec. 6, 1978

[51] Int. Cl.³ ............................................. B26D 1/12
[52] U.S. Cl. ................................... 407/91; 407/109; 407/113
[58] Field of Search ................. 407/37, 91, 109, 113, 407/114

[56] References Cited

U.S. PATENT DOCUMENTS

| 926,882 | 7/1909 | Lang | 407/91 |
|---|---|---|---|
| 2,329,872 | 9/1943 | Brownlee | 407/91 |
| 3,002,405 | 10/1961 | Heftler | 407/113 |
| 3,187,408 | 6/1965 | Titterud | 407/91 |
| 3,188,717 | 6/1965 | Heinlein | 407/114 |
| 3,191,261 | 6/1965 | Yore | 407/113 |
| 3,484,919 | 12/1969 | Steir | 407/113 |
| 3,675,290 | 7/1972 | Mayer | 407/37 |

Primary Examiner—Harrison L. Hinson
Attorney, Agent, or Firm—Robert G. Mentag

[57] ABSTRACT

A bottom face mill having an elongated body that has a pair of clamping jaws formed on the front end thereof. The clamping jaws are spaced apart by a V-shaped notch which terminates at its inner end at the front end of a transverse, longitudinally extended slot. A triangular cutting tool is held in the V-shaped notch by a pair of retaining pins and a clamping screw which forces the clamping jaws into a releasable clamping engagement with the triangular cutting tool.

2 Claims, 4 Drawing Figures

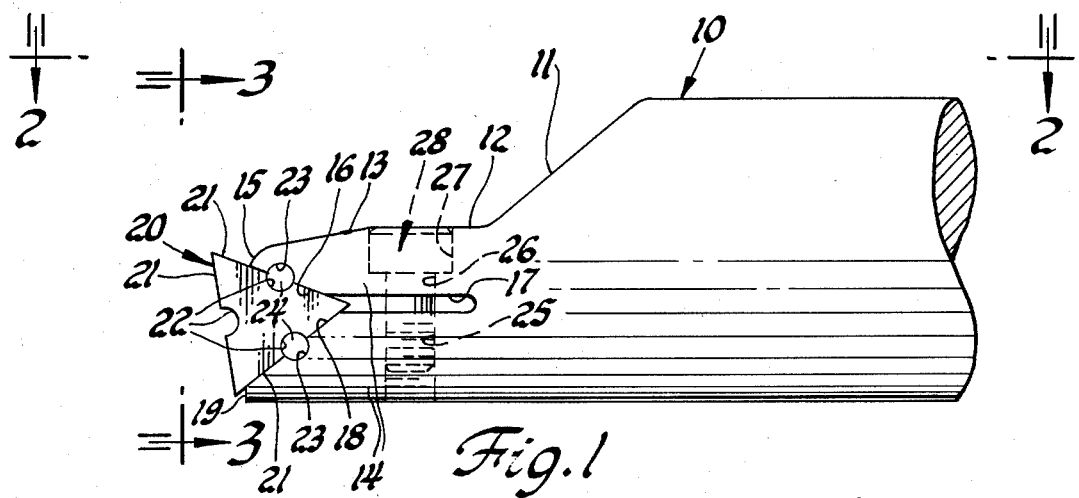
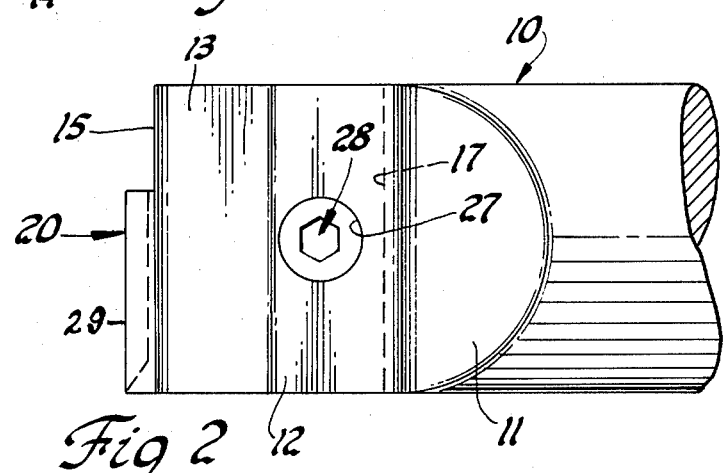
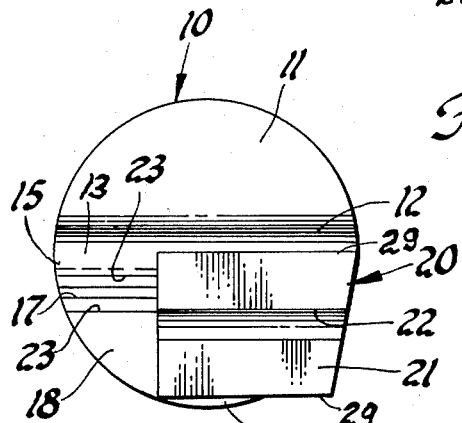
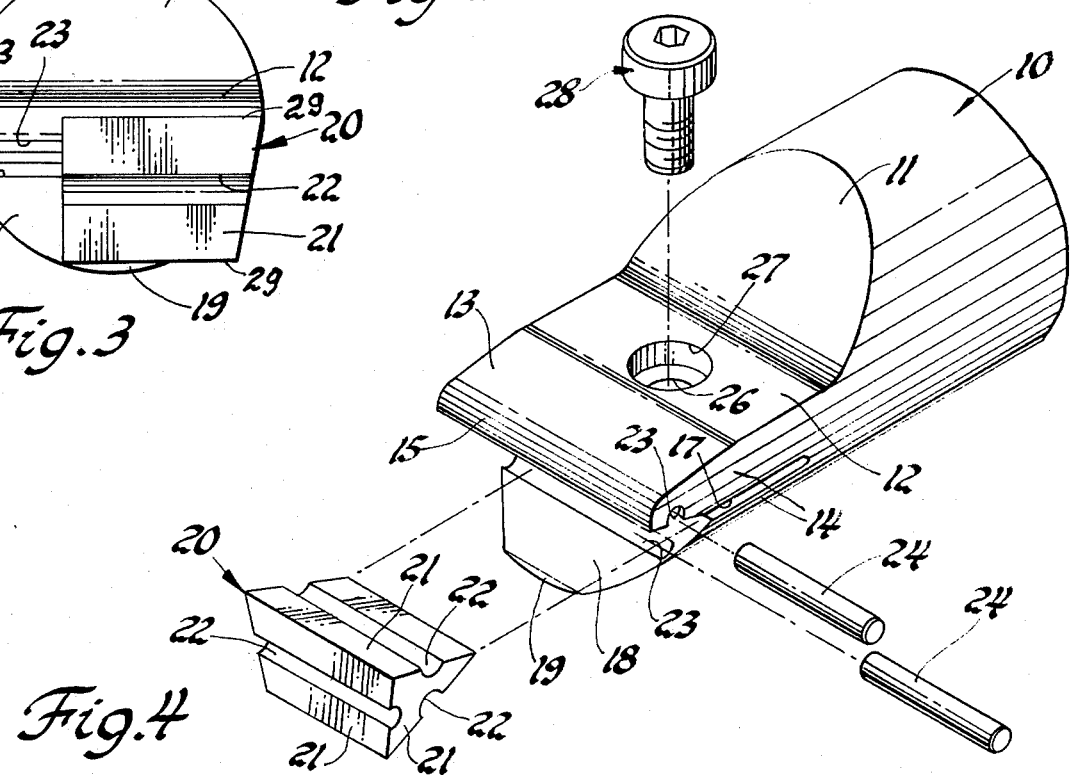

BOTTOM FACE MILL

BACKGROUND OF THE INVENTION

1. Field of the Invention

This invention relates to the cutting tool art, and more particularly, to a new and improved bottom face mill cutting tool. The invention is particularly concerned with a new and improved holder for a triangular cutting tool.

2. Description of the Prior Art

It is known in the cutting tool art to provide triangular cutting tools and holders or boring bars for carrying the same. Examples of the aforedescribed triangular cutting tools and holders therefor are described in U.S. Pat. Nos. 3,191,261; 3,455,002; 3,540,102; and, 3,882,580.

A problem and disadvantage of the prior art tool holders for triangular cutting tools is that they are complicated and expensive. A further disadvantage of the prior art tool holders for triangular cutting tools is that they cannot hold an elongated or long triangular cutting tool which can be resharpened many times to provide a long tool life and which has an initial lower cost than a short tool. The aforementioned elongated cutting tool also provides the advantage that it can provide unlimited bottom face mill diameters, whereas the prior art work holders cannot provide this feature.

SUMMARY OF THE INVENTION

In accordance with the present invention, the bottom face mill includes a boring bar or body which has a pair of clamping jaws formed on the front end thereof. The clamping jaws are spaced apart by a transverse, horizontal, longitudinally extended slot. A V-shaped notch is formed on the front end of the boring bar, as by means of an angular recess formed in the front end of each of the clamping jaws. The recess walls converge toward said slot to form an acute angled notch and a seal for a triangular cutting tool. The triangular cutting tool is held in the V-shaped notch or the tool seat by a pair of retaining pins and a clamping screw. The triangular cutting tool has three cutting edges which can be indexed three times on each end. The structure of the bottom face mill of the present invention provides a positive location of the triangular cutting tool when it is clamped in place with the clamping screw. The tool of the present invention can provide an unlimited bottom face mill diameter, and it can be used on lathes, milling machines, drill presses, boring machines, and the like.

Other objects, features and advantages of this invention will be apparent from the following detailed description, appended claims, and the accompanying drawings.

BRIEF DESCRIPTION OF THE DRAWINGS

FIG. 1 is a side elevation view of a bottom face mill made in accordance with the principles of the present invention.

FIG. 2 is a top plan view of the bottom face mill illustrated in FIG. 1, taken along the line 2—2 thereof, and looking in the direction of the arrows.

FIG. 3 is a front end elevation view of the bottom face mill illustrated in FIG. 1, taken along the line 3—3 thereof, and looking in the direction of the arrows.

FIG. 4 is an exploded, elevational perspective view of the bottom face mill illustrated in FIG. 1.

DESCRIPTION OF THE PREFERRED EMBODIMENT

Referring now to the drawing, and in particular to FIGS. 1 and 2, the numeral 10 generally designates a boring bar or body which is illustrated as being cylindrical in overall shape and adapted to be supported in an arbor of a milling machine, a drill press, a boring machine, a lathe, and the like. The bar 10 is reduced on its front end so as to provide a forwardly sloping face portion 11 which terminates at its front end at a flat face portion 12. The flat face portion 12 terminates at its front end at a forwardly sloping face 13 that terminates at a front rounded nose or end 15.

The front end of the bar 10 is divided into two clamping jaw portions 14 by a V-shaped notch or tool seat, and a longitudinal slot 17. The V-shaped notch or tool seat is formed by an acute angle recess which has converging walls or surfaces 16 and 18. The notch wall surfaces 16 and 18 terminate at their inner ends at the front end of said slot 17. The longitudinal slot 17 is transversely disposed, and extends horizontally inward in the bar 10, to approximately the inner end of the flat surface portion 12 on the front end of the bar 10. The V-shaped tool notch and slot 17 form a pair of spaced apart upper and lower clamping jaws 14. The front outer end of the upper jaw 14 is indicated by the rounded nose or end 15. The front end of the lower jaw 14 is indicated by the flat transverse face 19.

As shown in FIGS. 1 and 4, a transverse slot 23 is formed in the face of each of the V-shaped notch surfaces 16 and 18. The grooves 23 are semi-circular in cross sectional shape. An elongated triangular cutting tool, generally indicated by the numeral 20, is adapted to be seated in the V-shaped notch between the jaws 14, with two of its converging faces 21 seated against the V-notch walls or surfaces 16 and 18. Each of the triangular cutting tool faces 21 has formed therein a centrally disposed, longitudinally extended semi-circular groove 22, as shown in FIGS. 1 and 4.

As shown in FIG. 1, the triangular cutting tool 20 is retained in the V-shaped notch, or V-shaped seat, by a pair of retaining pins 24 which are cylindrical in shape, and which are slid sidewards into the elongated circular holes formed by each adjacent pair of semi-circular grooves 22 and 23. It will be understood that the retaining pins 24 may also be made integral with the jaws 14, whereby the elongated triangular cutting tool 20 would be slid endwise into the V-shaped notch, by sliding the cutting tool 20 into a side of the V-shaped notch and engaging the portion of the integral pins which would protrude outwardly in the V-shaped grooves 22 in the tool 20.

The triangular cutting tool 20 is releasably clamped between the jaws 14 by a suitable clamping screw, generally indicated by the numeral 28 in FIGS. 1, 2 and 4. The clamping screw 28 passes through the bores 27 and 22 in the upper jaw 14, and through the slot 17, and then downwardly into a threaded bore 25 in the lower jaw 14. As shown in FIG. 1, the bore 27 is enlarged to receive the head of the screw 28. It will be seen that as the clamping screw 28 is tightened it will releasably secure the triangular cutting tool 20 between the jaws 14.

It will be understood that the triangular cutting tool 20 may be formed from any suitable cutting tool material, or cutting tool metal, such as carbide or cutting tool steel. The cutting tool 20 is provided with three cutting edges 29, which provides an advantageous feature in that the cutting tool 20 can be indexed three times on each end to provide a long tool life before replacing the tool. The aforedescribed clamping structure provides positive location of the tool 20 in the V-shaped notch between the clamping jaws 14.

While it will be apparent that the preferred embodiment of the invention herein disclosed is well calculated to achieve the results aforestated, it will be appreciated that the invention is susceptible to modification, variation and change.

What is claimed is:

1. The combination of a tool and a holder, characterized in that:
   (a) the holder comprises an elongated body which has a front end provided with a V-shaped transverse notch that has two inwardly converging wall surfaces;
   (b) said holder body has a transverse, longitudinal slot, in the front end thereof, and the inner ends of the converging wall surfaces of said V-shaped notch terminate at the outer end of said longitudinal slot so as to communicate with said slot and divide the front end of the elongated holder body into a pair of spaced apart clamping jaws;
   (c) a triangular cutting tool is seated in said V-shaped notch;
   (d) there is means for releasably securing said triangular cutting tool in said V-shaped notch in said holder body;
   (e) said means for releasably securing said cutting tool in said V-shaped notch in said holder including retainer pin means operatively mounted between the holder body and the triangular cutting tool; and,
   (f) said retainer pin means includes at least one retainer pin which is operatively mounted in an elongated hole formed by a pair of opposing half-round grooves which are formed with one half-round groove in the holder body and with the other half-round groove in the triangular cutting tool.

2. The invention as defined in claim 1, characterized in that:
   (a) said means for releasably securing said cutting tool in said V-shaped notch in said holder includes clamping screw means for moving said pair of spaced apart clamping jaws and retainer pin means into clamping engagement with the triangular cutting tool.

* * * * *